Nov. 24, 1964 W. MARTI 3,158,231
HOISTING UNIT
Filed Jan. 21, 1963 2 Sheets-Sheet 1
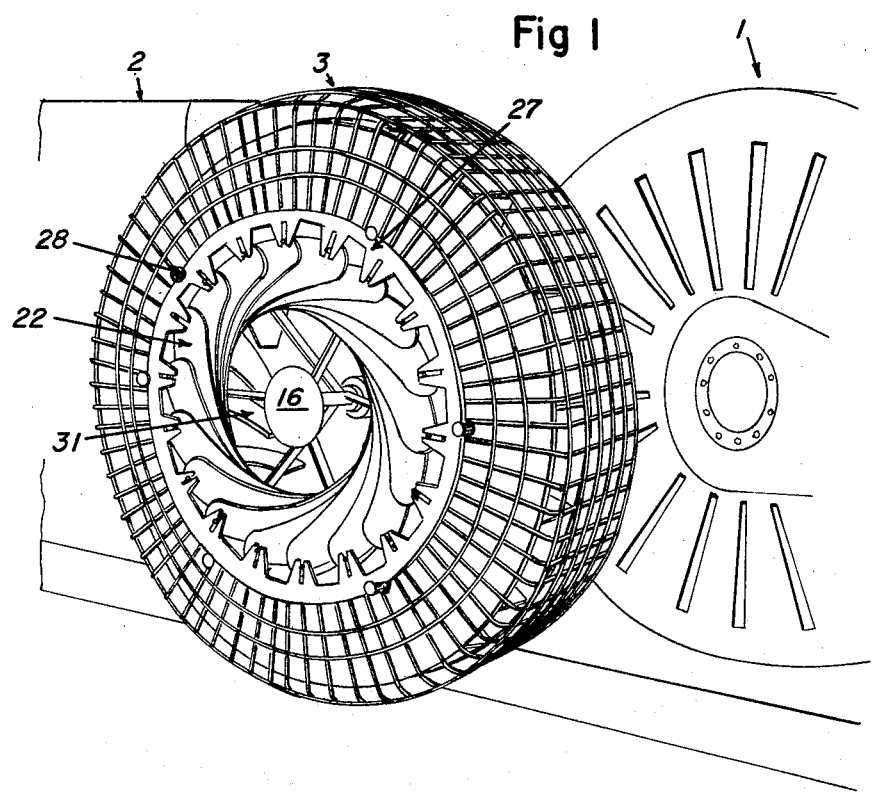
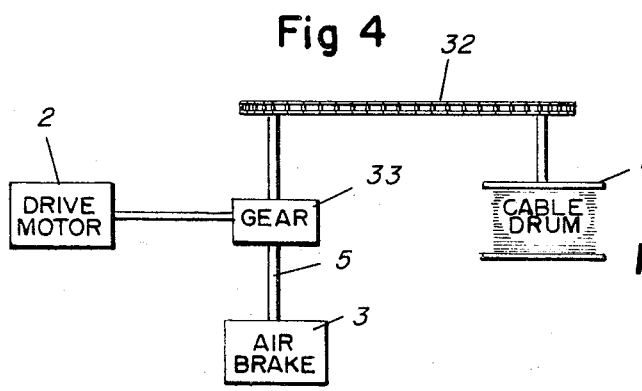
Walter Marti
INVENTOR.
BY Wenderoth, Lind & Ponack
ATTORNEYS Nov. 24, 1964  W. MARTI  3,158,231
HOISTING UNIT Filed Jan. 21, 1963  2 Sheets-Sheet 2

Walter Marti

INVENTOR

BY Wenderoth, Lind & Ponack
ATTORNEYS

United States Patent Office 3,158,231
Patented Nov. 24, 1964

3,158,231
HOISTING UNIT
Walter Marti, Reichenbach, near Frutigen, Bern, Switzerland, assignor to Jakob Wyssen, Reichenbach, near Frutigen, Bern, Switzerland
Filed Jan. 21, 1963, Ser. No. 252,858
Claims priority, application Switzerland, Jan. 22, 1962, 718/62
3 Claims. (Cl. 188—90)

This invention relates to a hoisting unit of the type using a supporting cable along which a travelling carriage for the load can be raised or lowered by means of a traction cable which winds up on a cable drum or unwinds therefrom.

The primary object of the invention is to provide an air vortex brake for controlling the unwinding movement of the cable drum of the hoisting unit.

Another object of the invention is the provision of means for regulating the action of the air vortex brake on the cable drum.

The invention will be more particularly described by way of example with reference to the accompanying diagrammatic drawings, in which:

FIGURE 1 is a perspective view of the air vortex brake and the cable drum;

FIGURE 4 is a diagrammatic view of the general assembly of the hoisting unit.

Figure 2:
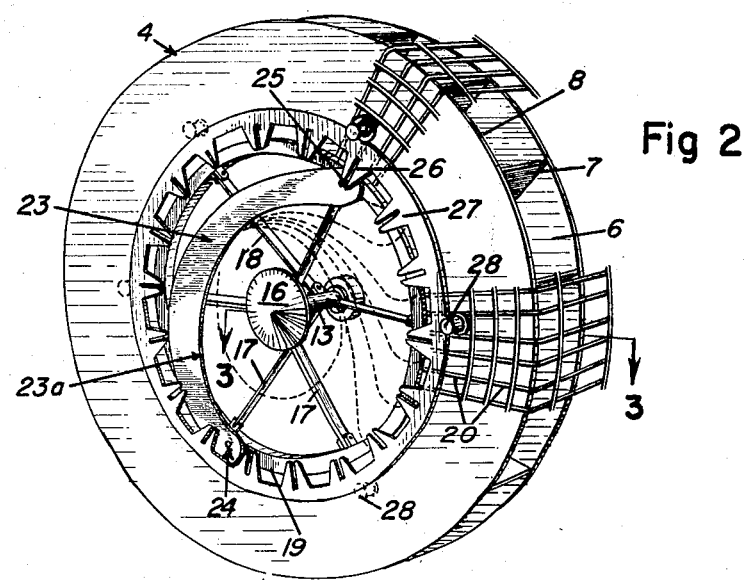
FIGURE 2 is a perspective view of the air vortex brake according to FIGURE 1, certain parts being omitted for the sake of clearness.

As it is generally known a cable hoisting unit may be used for lowering heavy loads suspended from a travelling carriage along a carrying cable along which the carriage is adapted to travel. The travelling carriage itself is connected to a traction cable which is wound up upon a cable drum 1. The drum 1 is operatively connected in any conventional manner to a driving motor 2 and to a brake 3. As shown by way of example in FIGURE 4, the drum 1 is connected by a chain drive 32 to a gear 33 which in turn is connected to a driving motor 2 and to an air vortex brake 3 serving to control the speed of the drum 1 when lowering a load.

Figure 3:
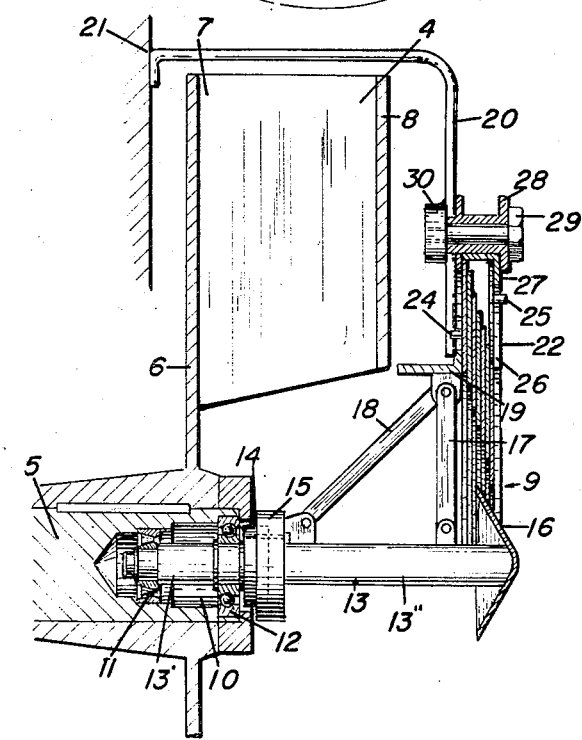
FIGURE 3 is a fragmentary axial section taken on the line 3—3 of FIGURE 2 through the air vortex brake.

As it is evident particularly from FIGURES 2 and 3, the air vortex brake 3 is provided with a rotary impeller 4 which is the present case is formed as a radially delivering blower wheel. The impeller 4 comprises a supporting disc 6 which is fixed for rotation with the main shaft 5 of the air vortex brake 3 and which carries the blower vanes 7. At their edges remote from the disc 6, the blower vanes 7 are interconnected by a disc 8. The admission of air to the vanes 7 is effected through a central suction opening 9. The main shaft 5 of the air vortex brake is driven by the gear 33 which also connects the driving motor 2 with the cable drum 1.

A supporting rod 13 consisting of the parts 13' and 13" is mounted in an axial bore 10 of the main shaft 5 by means of ball bearings 11 and 12. The two parts 13' and 13" are connected to each other by flanges 14 and 15. The arrangement is made so that the bearing member of the rod 13 is able to take up axial forces directed towards the main shaft 5. The rod 13 extends through the suction opening 9 and supports an air guide cone 16 at its front end. An annular member 19 of angular cross-section, surrounding the suction opening 9 is secured to the rod 13 by means of radial struts 17 and inclined struts 18, fixed to the rod 13. Besides, the wall 19 is connected with a protection cage 20 which surrounds the impeller rotor 4 and which in turn is secured to a stationary part 21. In this manner the annular member 19 is mounted on the main shaft 5 of the air vortex brake and maintained in axial direction, as also against rotation by the cage 20.

An adjustable shutter 22 (also see FIGURE 1) is mounted on the member 19, which shutter consists of a plurality of sections 23 (also see FIGURE 2) having an inner circularly curved edge 23a. These sections 23 are distributed in circumferential direction around the suction opening 9, one end of each section being pivotally secured to the front face of the member 19 by means of a pin 24 (see FIGURE 3). At the other end each section carries an outwardly directed pin 25 which engages into a radial slot 26 of a ring 27 of angular cross section surrounding the suction opening 9 (see particularly FIGURES 2 and 3). The ring 27 is rotatably supported by its outer periphery on rollers 28 distributed in circumferential direction. The rollers 28 are rotatably supported on the front face of the protection cage 20 by means of screws 29. The screws engage each a nut 30 which is secured to the rear side of the cage 20. The ring 27 can be rotated, whereby the sections 23 will each be angularly moved about their fixed pivot point 24, for example, from an extreme outer position in which they are concentrically arranged with respect to the suction opening 9, towards an inner extreme position, as this is illustrated by way of example for a single section in FIGURE 2 and with respect to all sections in FIGURE 1. As it will be seen from FIGURE 1, in this case the suction opening will be more or less closed, so that the suction air flowing into the impeller wheel is more or less throttled by the shutter opening 31. When rotating the adjusting ring 27 into its second extreme position, the shutter opening 31 becomes so small that it will be covered by the guide cone 16, this guide cone then overlapping the inner edges 23a of the sections 23.

The admission of air thus is restricted according to the degree of opening of the shutter 22 and therefore the braking force of the air vortex brake 3 will be influenced. It will be understood, that the damming pressure or the produced pressure head has a tendency to force the shutter sections 23 inwardly, whereby these sections will abut against the struts 17 which will take up the pressure. Eventually, the pressure head acting on the shutter 22 is taken up by the main shaft 5 of the air vortex brake.

The regulation of the braking action can be carried out by means of such an air vortex brake in a very precise and sensitive manner, whereby it is possible to adjust the lowering speed of the load to the prevailing inclination of the individual sections of the carrying cable. The braking action may be reduced for example on relatively slightly inclined cable sections and the lowering speed then increased, while on steep sections of the cable, any inadmissible increase in lowering speed can be checked by an increase of the shutter opening. Such a control of the braking force was hitherto used or possible in cable hoisting arrangements only by means of the usual friction brakes, which, however, for thermo-economical reasons are no longer in a position to meet the requirements with respect to the required high lowering speeds and high loads of modern hoisting equipment.

The fact, that the shutter opening is always symmetric with respect to the axis of the impeller wheel is of great importance, since a continuous braking characteristic is thus obtained.

It will be understood that in place of the shutter construction as shown also modified structures could be used, the shutter opening could be varied for example by means of a cone movably guided in axial direction.

I claim:

1. A cable hoisting unit comprising a cable drum, a driving motor operatively connected with said drum, an air vortex brake operatively connected with said driving motor and said cable drum, said air vortex brake comprising a rotary air displacing impeller, a shutter assembly disposed on the suction side of said impeller for regulating the rate of admission of air to said impeller, said shutter assembly comprising a series of pivotally movable shutter elements each having a radially inwardly circular arc-shaped limiting edge, a fixed annular member surrounding the suction opening of said impeller, a series of circumferentially spaced fixed hinge pins on said annular member, one end of each shutter element being pivotally connected to one of said hinge pins, a rotatably mounted adjusting ring supported by said annular member, the other end of each of said shutter elements being connected to said ring, a shaft for said impeller having an axial bore, a stationary rod engaging said axial bore to which said annular member is secured on which said shaft is rotatably mounted and being held in said bore against axial thrust caused by the damaging pressure of the air.

2. A cable hoisting unit according to claim 1, in which said annular member is connected with a stationary protecting member enclosing said impeller.

3. A cable hoisting unit according to claim 1, wherein said stationary rod carries a guide cone located in said suction opening to overlap the inner circular arc-shaped edge of the shutter elements in the extreme closure position of the shutter assembly.

References Cited by the Examiner

UNITED STATES PATENTS

| | | | |
|---|---|---|---|
| 1,181,873 | 5/16 | Gue et al. | 230—114 |
| 1,350,018 | 8/20 | Gill | 188—90 |
| 1,898,987 | 2/33 | Hale | 254—185 |
| 2,187,055 | 1/40 | Regnier | 230—114 |
| 2,415,670 | 2/47 | Black et al. | 188—90 |

FOREIGN PATENTS

| | | |
|---|---|---|
| 47,853 | 5/11 | Austria. |
| 855,852 | 2/40 | France. |

ARTHUR L. LA POINT, *Primary Examiner.*